United States Patent
Yamamoto et al.

(10) Patent No.: US 9,694,718 B2
(45) Date of Patent: Jul. 4, 2017

(54) VEHICLE SEAT

(71) Applicant: TOYOTA BOSHOKU KABUSHIKI KAISHA, Aichi-ken (JP)

(72) Inventors: Keisuke Yamamoto, Aichi-ken (JP); Taiyo Otsuka, Aichi-Ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/994,696

(22) Filed: Jan. 13, 2016

(65) Prior Publication Data
US 2016/0207424 A1  Jul. 21, 2016

(30) Foreign Application Priority Data
Jan. 16, 2015  (JP) .................. 2015-006512

(51) Int. Cl.
*B60N 2/06* (2006.01)
*B60N 2/07* (2006.01)

(52) U.S. Cl.
CPC .................. *B60N 2/0732* (2013.01)

(58) Field of Classification Search
CPC ................................. B60N 2/0732
USPC ................ 297/344.11; 248/429, 430
See application file for complete search history.

(56) References Cited

U.S. PATENT DOCUMENTS

| | | | | |
|---|---|---|---|---|
| 7,762,514 B2 * | 7/2010 | Koga | .................... | B60N 2/067 248/429 |
| 8,245,994 B2 * | 8/2012 | Yamada | ................. | B60N 2/073 297/344.11 X |
| 8,733,725 B2 * | 5/2014 | Kimura | ................. | B60N 2/0232 297/344.11 X |
| 2005/0269478 A1 * | 12/2005 | Woehrle | .................... | F16H 1/16 297/344.11 X |
| 2008/0078908 A1 * | 4/2008 | Koga | .................... | B60N 2/0232 297/344.11 X |
| 2008/0197654 A1 * | 8/2008 | Livesey | ................. | B60N 2/067 297/344.11 X |
| 2015/0129737 A1 * | 5/2015 | Oya | .................... | B60N 2/0722 248/429 |

FOREIGN PATENT DOCUMENTS

JP  2005-67557  3/2005

\* cited by examiner

*Primary Examiner* — Rodney B White
(74) *Attorney, Agent, or Firm* — Greenblum & Bernstein, P.L.C.

(57) ABSTRACT

A vehicle seat including: a seat cushion, a cushion frame; and a pair of slide rails on which the cushion frame is mounted and which is configured to support the cushion frame to be slidable relative to a floor, each slide rail including an upper rail, wherein two engaging portions are respectively provided to the upper rails, wherein four fitting portions which abut against and fit into the engaging portions are provided to the cushion frame, wherein each of the fitting portions includes at least two wall portions extending in a vertical direction, and wherein guide portions are provided at lower sides of the wall portions, the guide portions being configured to guide the fitting portions to be fitted into the engaging portions when the cushion frame comes close from above to the upper rails mounted on the floor.

4 Claims, 9 Drawing Sheets

VEHICLE SEAT

CROSS-REFERENCE TO RELATED APPLICATIONS

This application claims priority from Japanese Patent Application No. 2015-006512 filed on Jan. 16, 2015, the entire contents of which are incorporated herein by reference.

TECHNICAL FIELD

Aspects of the present disclosure relate to a vehicle seat in which the mounting workability to a vehicle is excellent.

BACKGROUND

There has been known a vehicle seat like a second-row scat of a one-box car, which is capable of increasing a position adjustment range in a longitudinal direction by including a long-size slide rail. In such long-slide vehicle seat, it is typical to adopt a method of installing a slide rail on a vehicle floor in advance and mounting a vehicle seat on an upper rail of the slide rail. In such case, as disclosed in JP-A-2005-67557, there is a method of placing a vehicle seat so that bolts or positioning pins protruding upward on an upper surface of the upper rail are allowed to pass through holes provided on a lower surface of a cushion frame, and fixing them by bolts and nuts, or the like. In this method, there is a need for an operation of lowering the vehicle seat from above so as to allow the holes of the lower surface of the cushion frame to correspond to the bolts or the positioning pins while confirming the position of the bolts or the positioning pins on the upper rail from a lateral lower side of the vehicle seat.

In the vehicle seat adopting the mounting method as described above, there are cases where the weight of the vehicle seat is increased due to the vehicle seat having many functions, or a shield member is mounted to a seat cushion side in order to improve an outer appearance of the vehicle seat. In these cases, it is difficult to perform an operation of lowering the vehicle seat on the upper rail while adjusting the mounting position of the vehicle seat. Therefore. two people have to perform the operation or a special device is required for lifting or lowering the vehicle seat. As a result, there is a problem that the workability is poor.

SUMMARY

In view of these problems, aspects of the present disclosure aims to provide a vehicle seat including a slide rail, in which mounting workability of the vehicle seat is improved at a time of mounting the vehicle seat on a slide rail mounted to a vehicle floor in advance.

According to an aspect of the present disclosure, there is provided a vehicle seat including: a seat cushion, a cushion frame which forms a framework of the seat cushion; and a pair of slide rails on which the cushion frame is mounted and which is configured to support the cushion frame to be slidable relative to a floor, each slide rail including an upper rail, wherein two engaging portions are respectively provided to the upper rails in a state of being spaced apart along the upper rails, wherein four fitting portions which abut against and fit into the engaging portions are provided to the cushion frame, wherein each of the fitting portions includes at least two wall portions extending in a vertical direction, and wherein guide portions are provided at lower sides of the wall portions, the guide portions being configured to guide the fitting portions to be fitted into the engaging portions when the cushion frame comes close from above to the upper rails mounted on the floor to be mounted to the upper rails Accordingly, in the vehicle seat including the slide rails, when mounting the vehicle seat on the slide rails disposed on the vehicle floor in advance, the fitting portions provided to the cushion frame are fitted into and mounted to the engaging portions provided to the upper rails. At this time, since the guide portions are provided to at least two wall portions forming the fitting portions, the cushion frame can be easily fitted into the engaging portions of the upper rails in a state of being aligned therewith. Thereby, it is not necessary to mount the vehicle seat on the vehicle while viewing from the lateral lower side of the vehicle seat, and therefore, it is possible to improve the mounting workability of the vehicle seat even when the weight of the vehicle seat is great or a shield is mounted to the vehicle seat.

DETAILED DESCRIPTION

Figure 1:
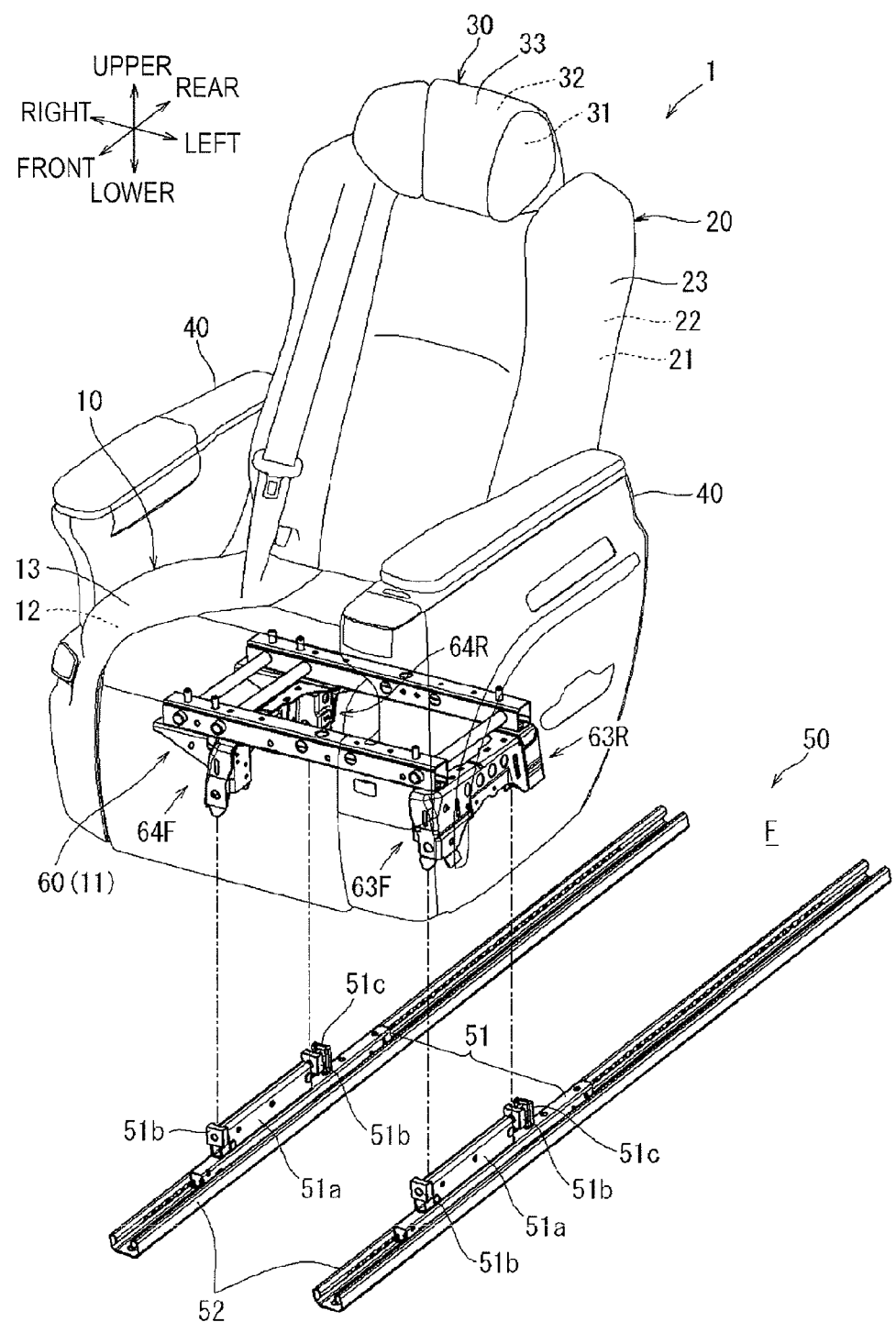
FIG. 1 is a perspective view of an automobile seat according to an illustrative embodiment of the present disclosure, as seen obliquely from the front.

FIGS. 1 to 10 are views showing an illustrative embodiment of the present disclosure. The present embodiment shows an example where the present disclosure is applied to an automobile seat. In each drawing, each direction of the vehicle at the time of mounting the automobile seat to an automobile is indicated by an arrow. in the following, a description regarding the directions is made with reference to these directions. An automobile seat 1 of the present embodiment includes a seat cushion 10 serving as a seating part, a seat back 20 serving as a backrest, a headrest 30 for supporting a head, an armrest 40, and a slide rail 50.

As shown in FIG. 1, the seat cushion 10, the seat back 20 and the headrest 30 respectively includes frames 11, 21, 31 constituting a framework, pads 12, 22, 32 serving as a cushioning material, and skins 13, 23, 33 serving as a skin material. Since the seat back 20, the headrest 30 and the armrest 40 have well-known configurations, a description thereof is omitted, and the seat cushion 10 and the slide rail 50 are described. Here, the automobile seat 1 corresponds to the "vehicle seat" in the claims.

Figure 2:
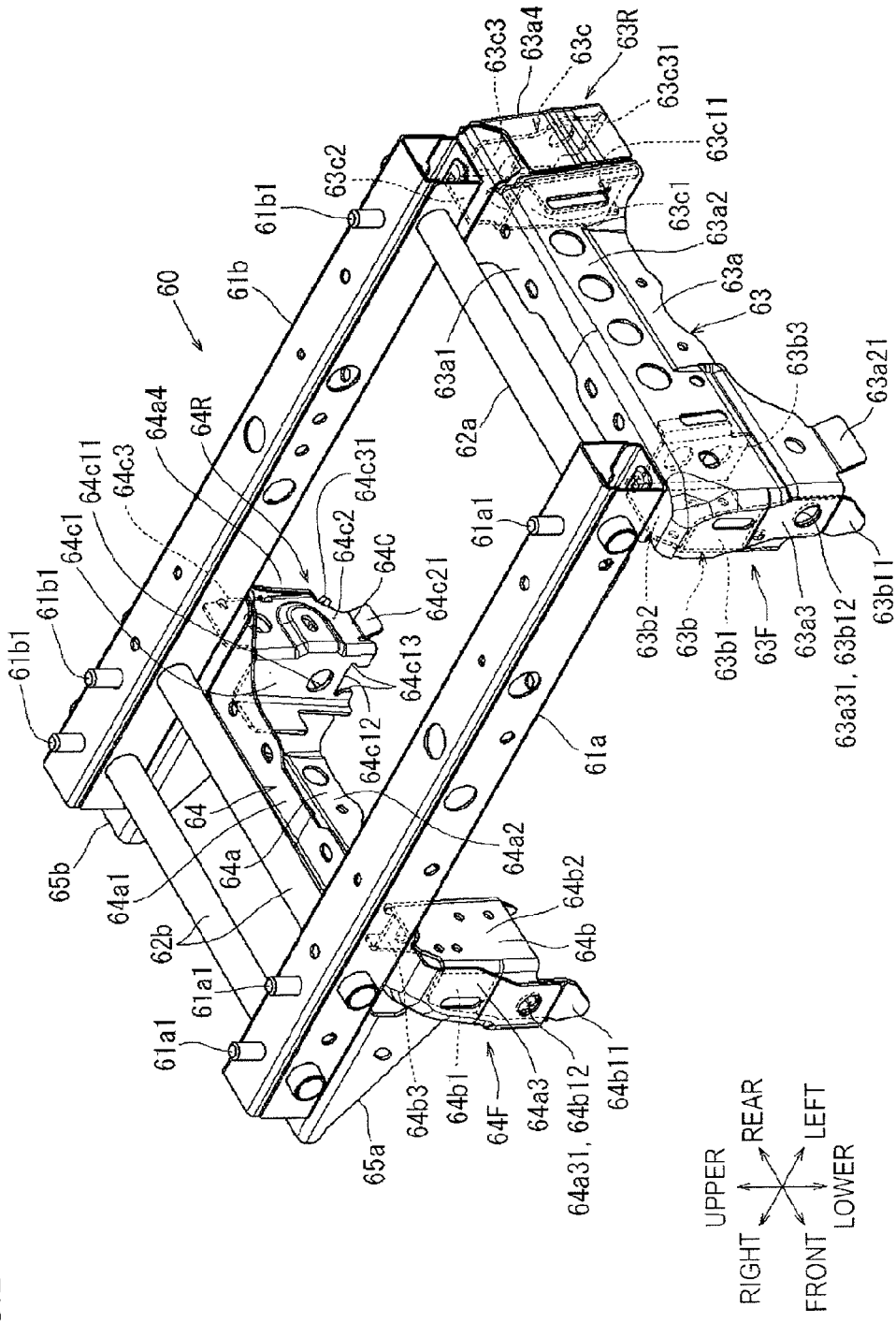
FIG. 2 is a perspective view of a portion of a cushion frame of the above embodiment, as seen obliquely from the front.

As shown in FIG. 2, the frame 11 of the seat cushion 10 is configured by an under frame 60 and an upper frame (not shown) securely placed on the under frame 60 and configured to support the pad 12 placed thereon. A lower end portion of the frame 21 of the seat back 20 is mounted to a rear end portion of the upper frame through a pair of recliners (not shown), so that the seat back 20 can be tilted relative to the seat cushion 10. The under frame 60 includes a front transverse frame 61*a* and a rear transverse frame 61*b*, which are a pair of transverse frames extending in parallel in a lateral direction, a left vertical frame 62*a* for connecting the left end portions of the front transverse frame 61*a* and the rear transverse frame 61*b* to each other, and two right vertical frames 62*b* for connecting the right end portions of the front transverse frame 61*a* and the rear transverse frame 61*b* to each other. The front transverse frame 61*a* and the rear transverse frame 61*b* are square pipe-shaped frames having a rectangular cross-section. The left vertical frame 62*a* and the right vertical frames 62*b* are round pipe-shaped frames having a circular cross-section. The front transverse frame 61*a*, the rear transverse frame 61*b*, the left vertical frame 62*a* and the right vertical frames 62*b* are formed in a substantially rectangular shape, as seen in a plan view. On an upper surface portion of the front transverse frame 61*a*, a total of three stud bolts 61*a*1 for fixing the upper frame are erected. Namely, one stud bolt 61*a*1 is erected on the left and two stud bolts 61*a*1 are erected on the right. On an upper surface portion of the rear transverse frame 61*b*, a total of three stud bolts 61*b*1 for fixing the upper frame are erected. Namely, one stud bolt 61*b*1 is erected on the left and two stud bolts 61*b*1 are erected on the right. Here, the frame 11 corresponds to the "cushion frame" in the claims.

A left bracket 63 is mounted to a lower side of the left end portions of the front transverse frame 61*a* and the rear transverse frame 61*b*, and a right bracket 64 is mounted to a lower side of a place slightly shifted to a seat inner side from the right end portions of the front transverse frame 61*a* and the rear transverse frame 61*b*. The left bracket 63 includes a left main bracket 63*a* extending in a longitudinal direction and connecting the lower sides of the left end portions of the front transverse frame 61*a* and the rear transverse frame 61*b* to each other, a sub bracket 63*b* connected to a front end portion of the left main bracket 63*a* to form a left front fitting portion 63F, and a sub bracket 63*c* connected to a rear end portion of the left main bracket 63*a* to form a left rear fitting portion 63R.

The left main bracket 63*a* includes an upper surface portion 63*a*1, a side surface portion 63*a*2 extending downward from the left side of the upper surface portion 63*a*1, a front surface portion 63*a*3 extending downward from the front side of the upper surface portion 63*a* 1, and a rear surface portion 63*a*4 extending downward from the rear side of the upper surface portion 63*a*1. The upper surface portion 63*a*1 longitudinally extends parallel to the lower surfaces of the front transverse frame 61*a* and the rear transverse frame 61*b* and is connected to the front transverse frame 61*a* and the rear transverse frame 61*b* by bolts.

Figure 3:
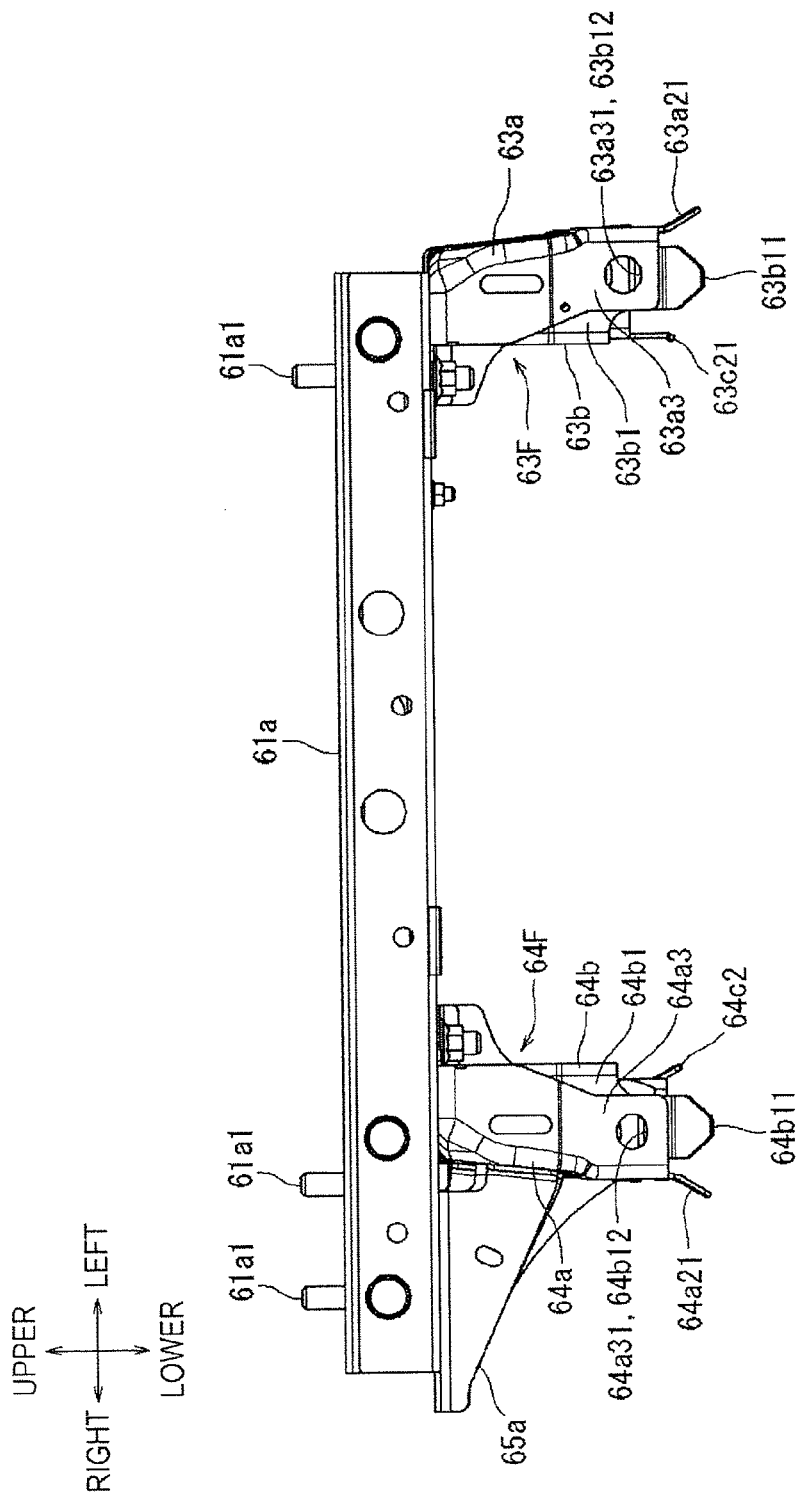
FIG. 3 is a front view of a portion of the cushion frame of the above embodiment.
Figure 8:
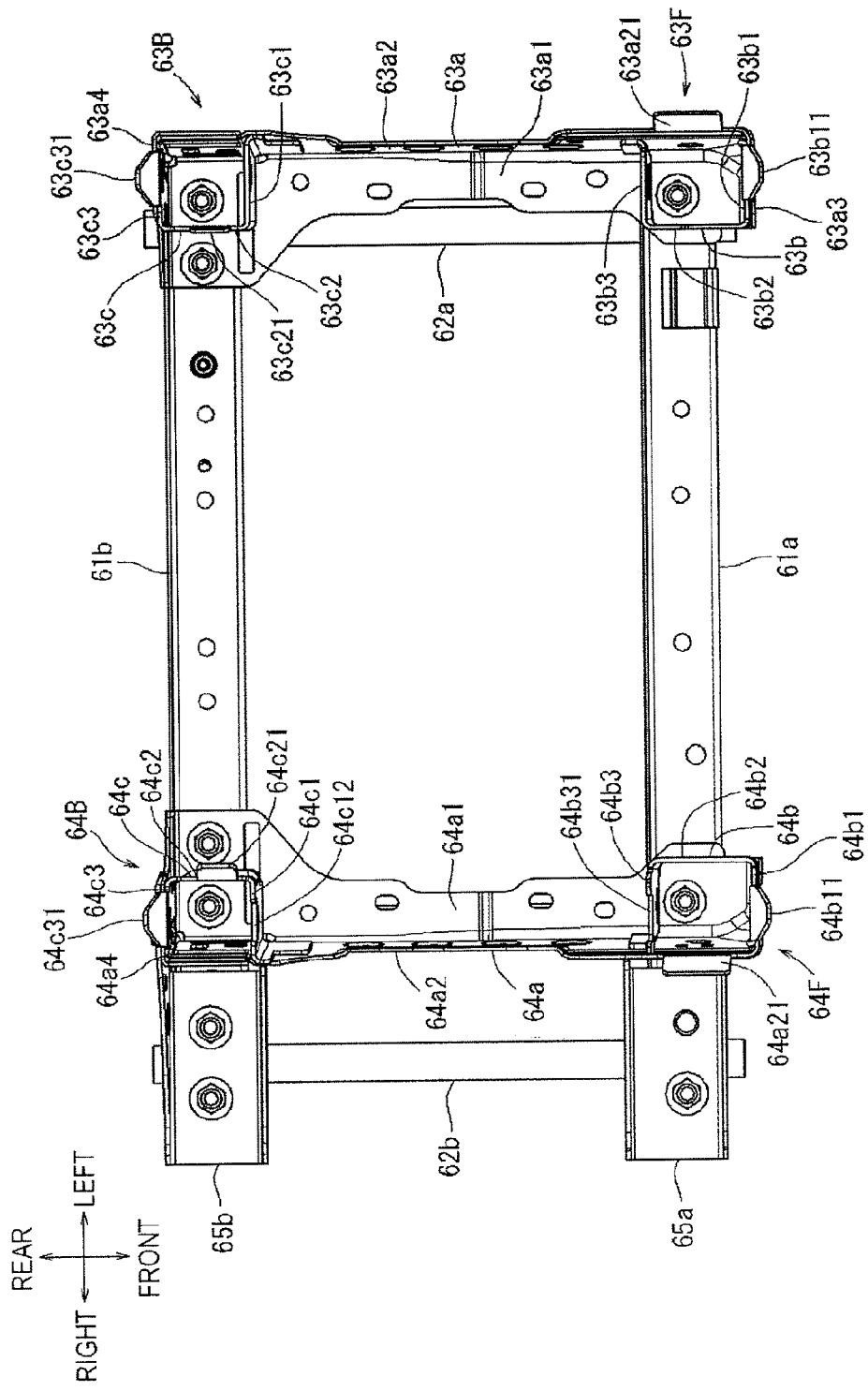
FIG. 8 is a bottom view of a portion of the cushion frame of the above embodiment.

As shown in FIGS. 2, 3 and 8, the sub bracket 63*b* is a substantially U-shaped member in which a cross-section taken along a plane parallel to the lower surfaces of the front transverse frame 61*a* and the rear transverse frame 61*b* has an opening to the left. The sub bracket 63*b* includes a front surface portion 63*b*1, a right surface portion 63*b*2, and a rear surface portion 63*b*3. The front surface portion 63*b*1 is welded to a rear surface of the front surface portion 63*a*3 of the left main bracket 63*a*. A flange portion provided on the left end portion of the rear surface portion 63*b*3 so as to extend rearward is welded to a right side surface of the side surface portion 63*a*2 of the left main bracket 63*a*. In this way, the square tube-shaped left front fitting portion 63F having a rectangular cross-section is formed. A guide portion 63*b*11 extending forward and downward is formed at a lower end portion of the front surface portion 63*b*1. The guide portion 63*b*11 protrudes forward and downward from the lower end portion of the front surface portion 63*a*3 of the left main bracket 63*a*. A guide portion 63*a*21 extending leftward and downward is formed at a lower end portion of the place of the side surface portion 63*a*2 of the left main bracket 63*a*, which faces the right surface portion 63*b*2 of the sub bracket 63*b*. A bolt hole 63*b*12 and a bolt hole 63*a*31 are provided to a lower side of the front surface portion 63*b*1 and a lower side of the front surface portion 63*a*3. The bolt hole 63*b*12 and the bolt hole 63*a*31 have the same axis and diameter in the state where the sub bracket 63*b* is mounted to the left main bracket 63*a*.

Figure 4:
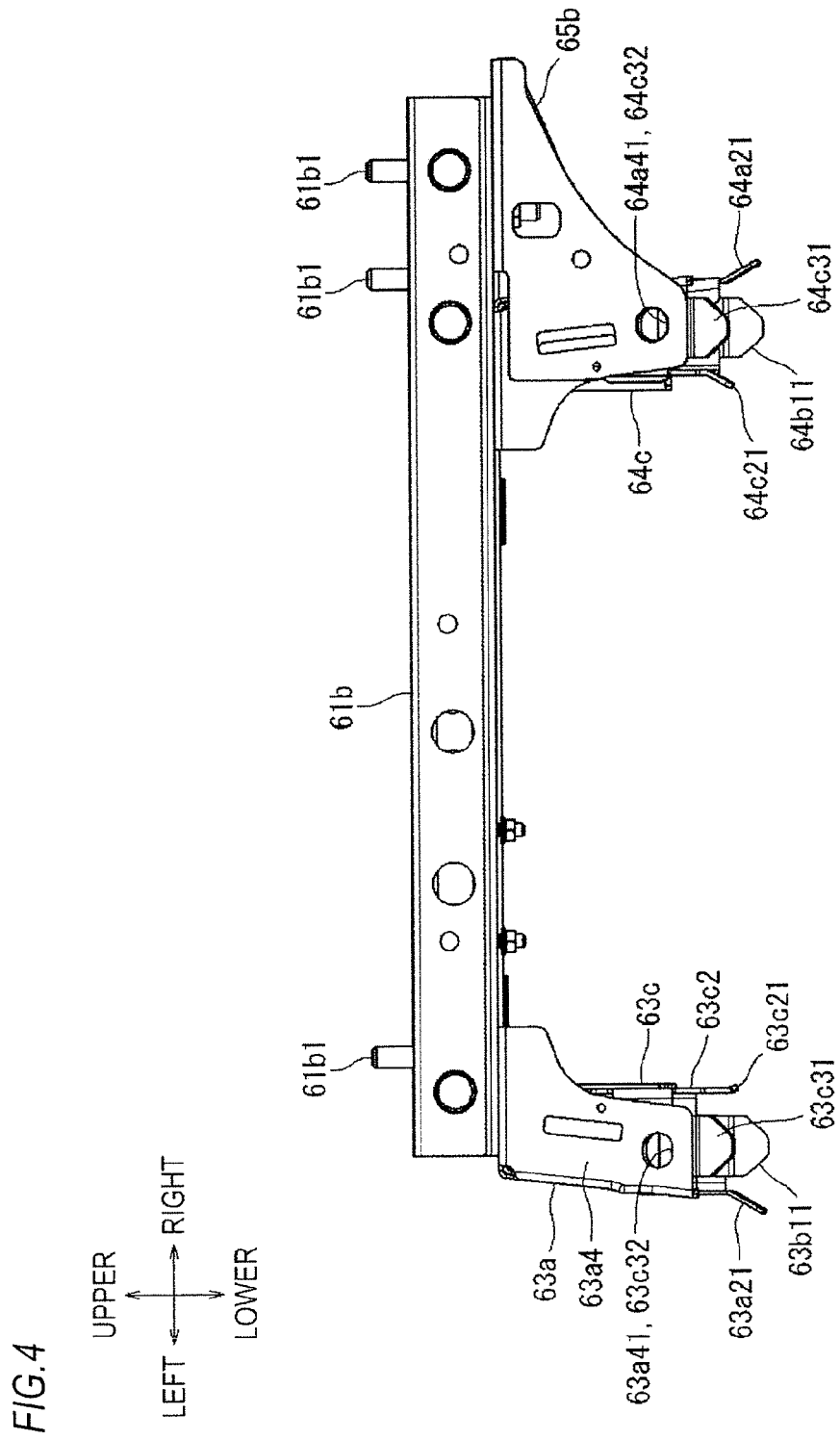
FIG. 4 is a rear view of a portion of the cushion frame of the above embodiment.
Figure 5:
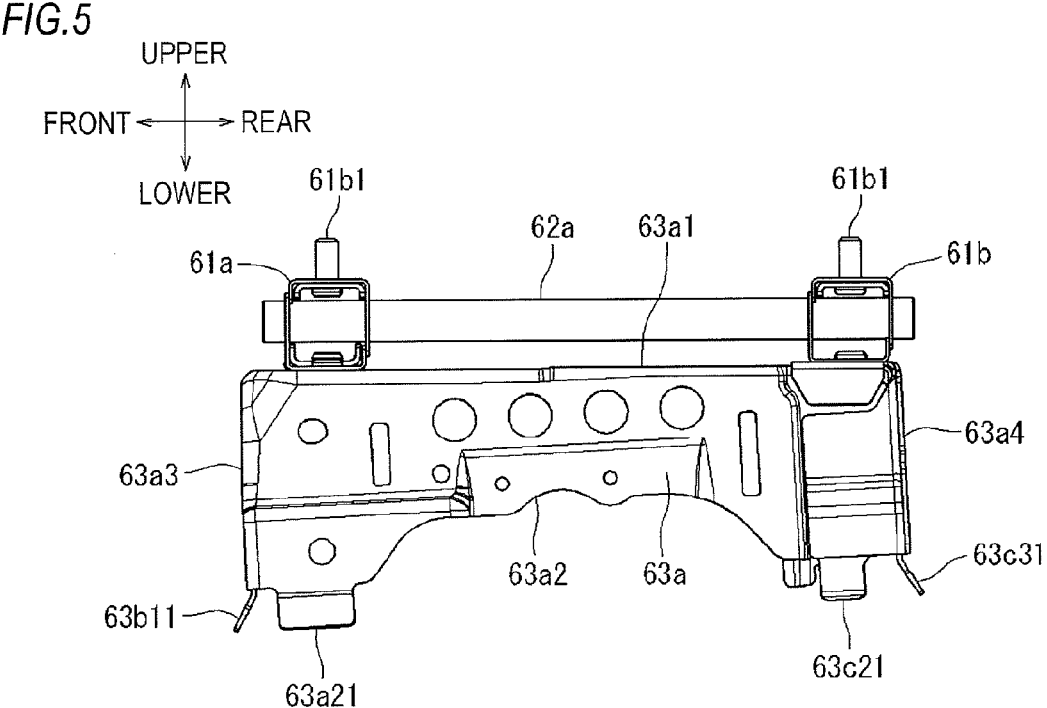
FIG. 5 is a left side view of a portion of the cushion frame of the above embodiment.
Figure 6:
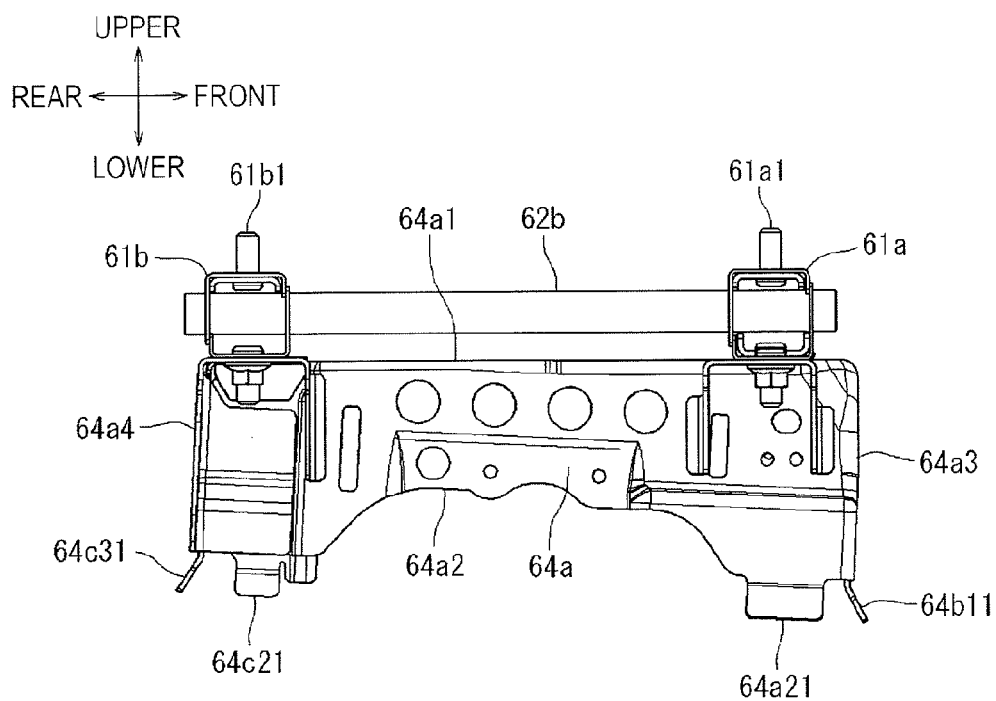
FIG. 6 is a right side view of a portion of the cushion frame of the above embodiment.
Figure 7:
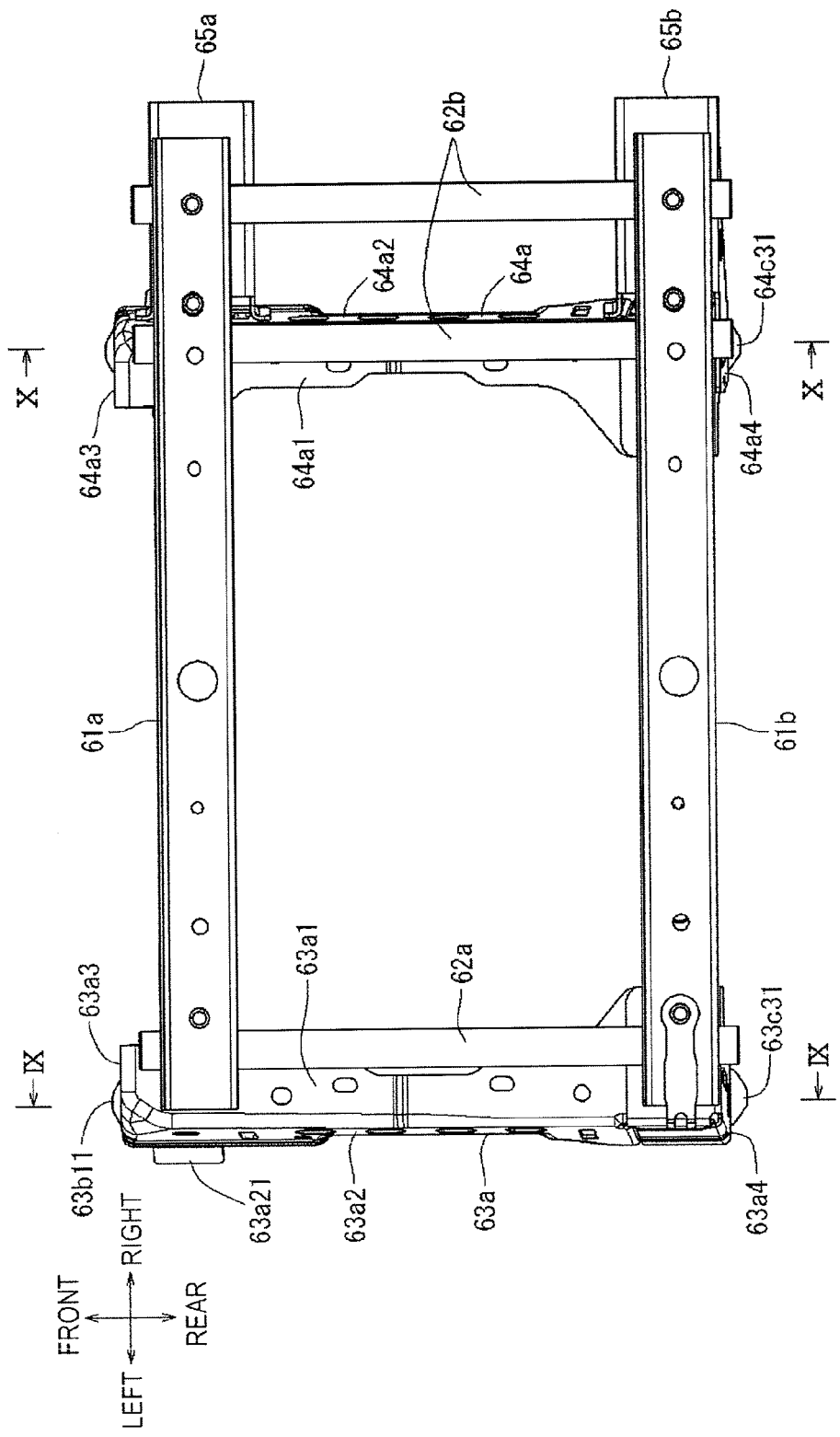
FIG. 7 is a plan view of a portion of the cushion frame of the above embodiment.

As shown in FIGS. 2, 4 and 8, the sub bracket 63*c* is a substantially U-shaped member in which a cross-section taken along a plane parallel to the lower surfaces of the front transverse frame 61*a* and the rear transverse frame 61*b* has an opening to the left. The sub bracket 63*c* includes a front surface portion 63*c*1, a right surface portion 63*c*2, and a rear surface portion 63*c*3. The rear surface portion 63*c*3 is welded to a front surface of the rear surface portion 63*a*4 of the left main bracket 63*a*. A flange portion provided on the left end portion of the front surface portion 63*c*1 so as to extend forward is welded to a right side surface of the side surface portion 63*a*2 of the left main bracket 63*a*. In this way, the square tube-shaped left rear fitting portion 63R having a rectangular cross-section is formed. A guide portion 63*c*31 extending rearward and downward is formed at a lower end portion of the rear surface portion 63*c*3. The guide portion 63*c*31 protrudes rearward and downward from the lower end portion of the rear surface portion 63*a*4 of the left main bracket 63*a*. A guide portion 63*c*21 extending rightward and downward is formed at a lower end portion of the right surface portion 63*c*2 of the sub bracket 63*c*. A bolt hole 63*c*32 and a bolt hole 63*a*41 are provided to a lower side of the rear surface portion 63*c*3 and a lower side of the rear surface portion 63*a*4. The bolt hole 63*c*32 and the bolt hole 63*a*41 have the same axis and diameter in the state where the sub bracket 63*c* is mounted to the left main bracket 63*a*. A bolt hole 63*c*11 is provided to a lower side of the front surface portion 63*c*1 of the sub bracket 63*c*. The bolt hole 63*c*11 has the same axis and diameter as the bolt hole 63*c*32 and the bolt hole 63*a*41. This is intended to avoid the interference between a long-axis bolt and the bolt holes when the long-axis bolt passes through the bolt hole 63*c*32 and the bolt hole 63*a*41 to fasten the left bracket 63 to a rear block body 51*b*. Here, the rear block body 51*b* is one of the engaging parts of the upper rail 51 (to be described later).

As shown in FIG. 2, the right bracket 64 includes a right main bracket 64*a* extending in a longitudinal direction and connecting the lower sides of a place slightly shifted to a seat inner side from the right end portions of the front transverse frame 61*a* and the rear transverse frame 61*b* to each other, a sub bracket 64*b* connected to a front end portion of the right main bracket 64*a* to form a right front fitting portion 64F, and a sub bracket 64*c* connected to a rear end portion of the right main bracket 64*a* to form a right rear fitting portion 64R. The right main bracket 64*a* includes an upper surface portion 64a1, a side surface portion 64a2 extending downward from the right side of the upper surface portion 64a1, a front surface portion 64a3 extending downward from the front side of the upper surface portion 64a1, and a rear surface portion 64a4 extending downward from the rear side of the upper surface portion 64a1. The upper surface portion 64a1 longitudinally extends parallel to the lower surfaces of the front transverse frame 61a and the rear transverse frame 61b and is connected to the front transverse frame 61a and the rear transverse frame 61b by bolts.

As shown in FIGS. 2, 3 and 8, the sub bracket 64b is a substantially U-shaped member in which a cross-section taken along a plane parallel to the lower surfaces of the front transverse frame 61a and the rear transverse frame 61b has an opening to the right. The sub bracket 64b includes a front surface portion 64b1, a left surface portion 64b2, and a rear surface portion 64b3. The front surface portion 64b1 is welded to a rear surface of the front surface portion 64a3 of the right main bracket 64a. A flange portion provided on the right end portion of the rear surface portion 64b3 so as to extend rearward is welded to a left side surface of the side surface portion 64a2 of the right main bracket 64a. In this way, the square tube-shaped left front fitting portion 64F having a rectangular cross-section is formed. A guide portion 64b11 extending forward and downward is formed at a lower end portion of the front surface portion 64b1. The guide portion 64b11 protrudes forward and downward from the lower end portion of the front surface portion 64a3 of the right main bracket 64a. A guide portion 64a21 extending rightward and downward is formed at a lower end portion of the place of the side surface portion 64a2 of the right main bracket 64a, which faces the left surface portion 64b2 of the sub bracket 64b. A bolt hole 64b12 and a bolt hole 64a31 are provided to a lower side of the front surface portion 64b1 and a lower side of the front surface portion 64a3. The bolt hole 64b12 and the bolt hole 64a31 have the same axis and diameter in the state where the sub bracket 64b is mounted to the right main bracket 64a.

As shown in FIGS. 2, 4 and 8, the sub bracket 64c is a substantially U-shaped member in which a cross-section taken along a plane parallel to the lower surfaces of the front transverse frame 61a and the rear transverse frame 61b has an opening to the right. The sub bracket 64c includes a front surface portion 64c1, a left surface portion 64c2, and a rear surface portion 64c3. The rear surface portion 64c3 is welded to a front surface of the rear surface portion 64a4 of the right main bracket 64a. A flange portion provided on the right end portion of the front surface portion 64c1 so as to extend forward is welded to a left side surface of the side surface portion 64a2 of the right main bracket 64a. In this way, the square tube-shaped right rear fitting portion 64R having a rectangular cross-section is formed. A guide portion 64c31 extending rearward and downward is formed at a lower end portion of the rear surface portion 64c3. The guide portion 64c31 protrudes rearward and downward from the lower end portion of the rear surface portion 64a4 of the right main bracket 64a. A guide portion 64c21 extending leftward and downward is formed at a lower end portion of the left surface portion 64c2 of the sub bracket 64c. A bolt hole 64c32 and a bolt hole 64a41 are provided to a lower side of the rear surface portion 64c3 and a lower side of the rear surface portion 64a4. The bolt hole 64c32 and the bolt hole 64a41 have the same axis and diameter in the state where the sub bracket 64c is mounted to the right main bracket 64a. A bolt hole 64c11 is provided to a lower side of the front surface portion 64c1 of the sub bracket 64c. The bolt hole 64c11 has the same axis and diameter as the bolt hole 64c32 and the bolt hole 64a41. This is intended to avoid the interference between a long-axis bolt and the bolt holes when the long-axis bolt passes through the bolt hole 64c32 and the bolt hole 64a41 to fasten the right bracket 64 to the rear block body 51b. Here, the rear block body 51b is one of the engaging parts of the upper rail 51 (to be described later). Further, a substantially inverted U-shaped cutout portion 64c12 is provided at a lower end portion of the front surface portion 64c1 of the sub bracket 64c. This cutout portion 64c12 is intended for more accurately performing the positioning in the lateral direction of the under frame 60 relative to the slide rail 50 by being engaged with a portion of the upper rail. Expanded portions 64c13 provided at both upper ends of the cutout portion 64c12 are intended for avoiding the interference by avoiding a round portion R formed in an engaging portion that is a portion of the upper rail. Meanwhile, as shown in FIG. 8, a cutout portion 64b31 similar to the cutout portion 64c12 is also provided at a lower end portion of the rear surface portion 64b3 of the sub bracket 64b. In the same manner as the cutout portion 64c12, the cutout portion 64b31 is also intended for more accurately performing the positioning in the lateral direction of the under frame 60 relative to the slide rail 50.

As shown in FIGS. 2 to 4, each of the front transverse frame 61a and the rear transverse frame 61b has an overhang portion toward the right from the portion to which the right bracket 64 is attached. In order to support the overhang portions, a front support member 65a is attached between the front transverse frame 61a and the right bracket 64, and a rear support member 65b is attached between the rear transverse frame 61b and the right bracket 64. Meanwhile, a bolt hole is provided at the portion of the rear support member 65b, which corresponds to the rear surface portion 64a4 of the right main bracket 64a. The bolt hole has the same axis and diameter as the bolt hole 64c32 and the bolt hole 64a41.

Figure 9:
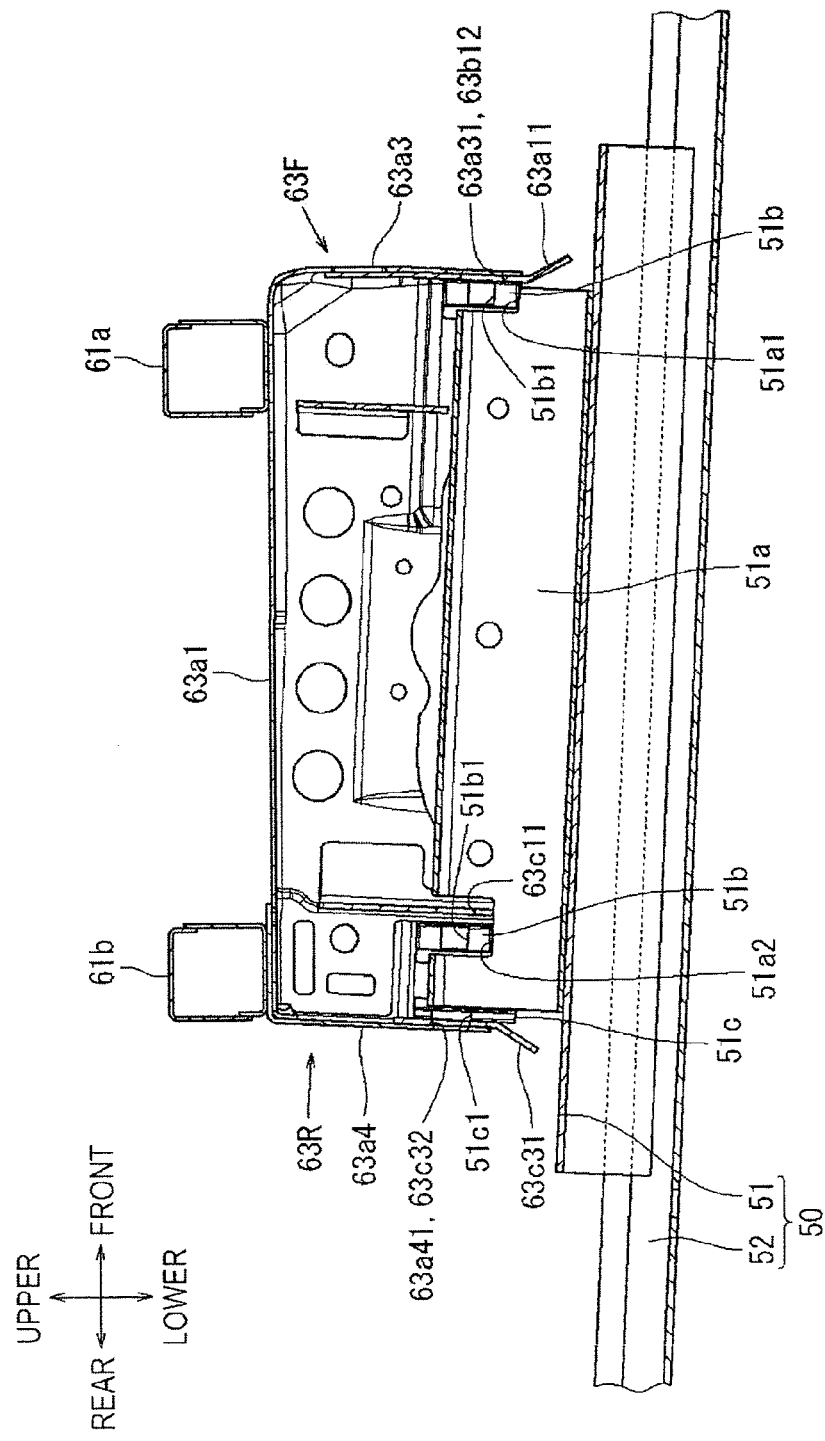
FIG. 9 is a sectional view taken along an arrow IX-IX shown in FIG. 7, showing a state where a portion of the cushion frame of the above embodiment is mounted to a slide rail.
Figure 10:
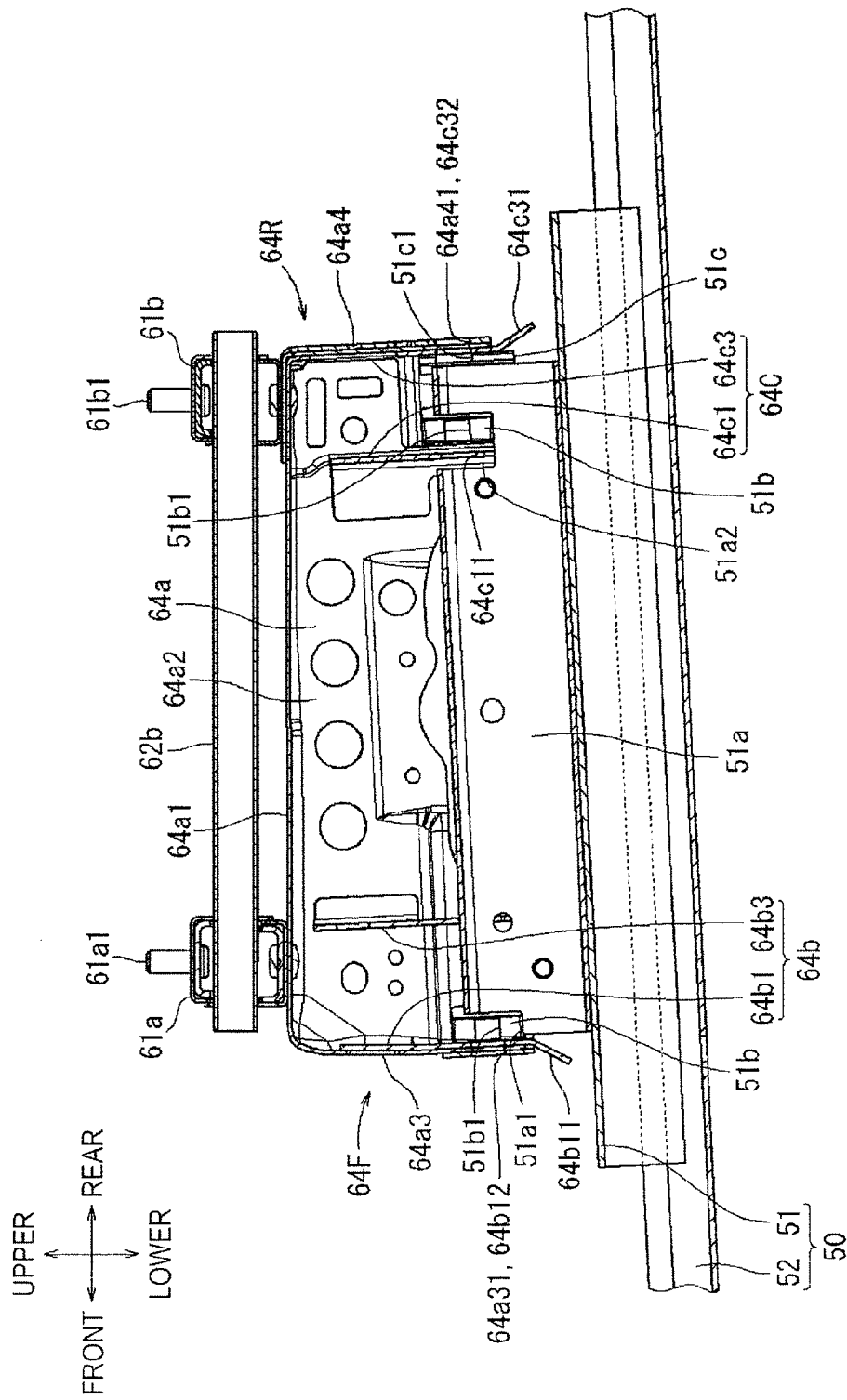
FIG. 10 is a sectional view taken along an arrow X-X shown in FIG. 7, showing a state where a portion of the cushion frame of the above embodiment is mounted to the slide rail.

As shown in FIGS. 1, 9 and 10, the automobile seat 1 is mounted to the upper rails 51 of a pair of left and right slide rails 50 disposed on a floor F and is slidable in the longitudinal direction. The slide rails 50 include a pair of lower rails 52 extending in the longitudinal direction relative to the floor F and disposed parallel to each other, and the upper rails 51 mounted so as to be slidable relative to the lower rails 52. The lower rail 52 is a long slide type rail which is about twice as long as the longitudinal length of the automobile seat 1 in a standard state. The upper rail 51 has a length substantially equal to the longitudinal length of the seat cushion 10. An engaging portion frame 51a, which is a square pipe-shaped member having a rectangular cross-section, is mounted on the upper surface of the upper rail 51 so that a longitudinal direction is aligned with a longitudinal direction (sliding direction) of the upper rail 51. A cutout portion 51a1 is provided to an upper front end portion of the engaging portion frame 51a. A square prism-shaped block body 51b having a bolt hole 51b1 formed at the center is mounted into the cutout portion 51a1 so that the bolt hole 51b1 faces the longitudinal direction. Further, a cutout portion 51a2, which has a substantially U shape as seen in a side view, is provided at an upper portion near the rear end portion of the engaging portion frame 51a. The block body 51b is mounted into the rear end portion of the cutout portion 51a2 so that the bolt hole 51b1 faces the longitudinal direction. The lateral and vertical length of the block body 51b is set to be longer than the vertical length of the engaging portion frame 51a. A rectangular plate 51c, which has a lateral length equal to the block body 51b and has a bolt hole 51c1 provided at the center, is mounted to the rear end portion of the engaging portion frame 51*a* so that the bolt hole 51*b*1 of the block body 51*b* and the bolt hole 51*c*1 have the same axis. The block body 51*b* mounted to the front side of the engaging portion frame 51*a*, and the block body 51*b* and the plate 51*c*, which are mounted to the rear side of the engaging portion frame 51*a*, respectively, correspond to the "engaging part" in the claims.

As shown in FIG. 9, the left front fitting portion 63F of the left bracket 63 is engaged with the front block body 51*b* of the engaging portion frame 51*a* mounted on the left upper rail 51. Further, the left rear fitting portion 63R of the left bracket 63 is engaged with the rear block body 51*b* and the plate 51*c* of the engaging portion frame 51*a*, which are mounted on the left upper rail 51. In this state, the bolt hole 51*b*1 of the front block body 51*b* is arranged to have the same axis as the bolt holes 63*a*31, 63*b*12 of the left front fitting portion 63F, so that a bolt can be fastened from the front. Further, the bolt hole 51*b*1 of the rear block body 51*b* and the bolt hole 51*c*1 of the plate 51*c* are arranged to have the same axis as the bolt holes 63*a*41, 63*c*32, 63*c*11 of the left rear fitting portion 63R, so that a bolt can be fastened from the rear. At this time, a front surface of the front block body 51*b* is abutted against a rear surface of the front surface portion 63*b*1 of the sub bracket 63*b*, and a left surface of the front block body 51*b* is abutted against a right surface of the side surface portion 63*a*2 of the left main bracket 63*a*. Further, a rear surface of the plate 51*c* is abutted against a front surface of the rear surface portion 63*c*3 of the sub bracket 63*c*, and left surfaces of the plate 51*c* and the rear block body 51*b* are abutted against a right surface of the side surface portion 63*a*2 of the left main bracket 63*a*. In this way, the left bracket 63 is positioned relative to the left upper rail 51 so that the left bracket 63 cannot move in the longitudinal direction and to the right direction.

As shown in FIG. 10, the right front fitting portion 64F of the right bracket 64 is engaged with the front block body 51*b* of the engaging portion frame 51*a* mounted on the right upper rail 51. Further, the right rear fitting portion 64R of the right bracket 64 is engaged with the rear block body 51*b* and the plate 51*c* of the engaging portion frame 51*a*, which are mounted on the right upper rail 51. In this state, the bolt hole 51*b*1 of the front block body 51*b* is arranged to have the same axis as the bolt holes 64*a*31, 64*b*12 of the right front fitting portion 64F, so that a bolt can be fastened from the front. Further, the bolt hole 51*b*1 of the rear block body 51*b* and the bolt hole 51*c*1 of the plate 51*c* are arranged to have the same axis as the bolt holes 64*a*41, 64*c*32, 64*c*11 of the right rear fitting portion 64R, so that a bolt can be fastened from the rear. At this time, a front surface of the front block body 51*b* is abutted against a rear surface of the front surface portion 64*b*1 of the sub bracket 64*b*, and a right surface of the front block body 51*b* is abutted against a left surface of the side surface portion 64*a*2 of the right main bracket 64*a*. Further, a rear surface of the plate 51*c* is abutted against a front surface of the rear surface portion 64*c*3 of the sub bracket 64*c*, and right surfaces of the plate 51*c* and the rear block body 51*b* are abutted against a left surface of the side surface portion 64*a*2 of the right main bracket 64*a*. In this way, the right bracket 64 is positioned relative to the right upper rail 51 so that the left bracket 64 cannot move in the longitudinal direction and to the left direction.

The present embodiment configured as described above provides the following operational effects. As shown in FIG. 1, when mounting the automobile seat 1 on the upper rails 51 of the pair of left and right slide rails 50 disposed on the floor F, first, the positions in the longitudinal direction of the left and right upper rails 51 are aligned. In this state, the fitting portions 63F, 63R, 64F, 64R of the automobile seat 1 come close from above to the front block body 51*b* and the rear block body 51*b* and the plate 51*c* of the left and right upper rails 51. At this time, on the seat left side, the guide portion 63*b*11 of the left front fitting portion 63F is abutted against a front upper corner portion of the front block body 51*b* of the left upper rail 51, or, the guide portion 63*c*31 of the left rear fitting portion 63R is abutted against a rear tipper corner portion of the plate 51*c* of the left upper rail 51. Further, the guide portion 63*a*21 of the left front fitting portion 63F is abutted against a left upper corner portion of the front block body 51*b* of the left upper rail 51, or, the guide portion 63*c*21 of the left rear fitting portion 63R is abutted against a rear upper corner portion of the rear block body 51*b* and the plate 51*c* of the left upper rail 51. As the automobile seat 1 is lowered in this state, the front block body 51*b* is guided while being in sliding contact with the guide portion 63*b*11 and the guide portion 63*a*21 of the left front fitting portion 63F. In this way, the front block body 51*b* is positioned relative to the left front fitting portion 63F. Further, the rear block body 51*b* and the plate 51*c* are guided while being in sliding contact with the guide portion 63*c*31 and the guide portion 63*c*21 of the left rear fitting portion 63R. In this way, the rear block body 51*b* and the plate 51*c* are positioned relative to the left fitting portion 63R. Similarly, also on the seat right side, the guide portion 64*b*11 of the right front fitting portion 64F is abutted against a front upper corner portion of the front block body 51*b* of the right upper rail 51, or, the guide portion 64*c*31 of the right rear fitting portion 64R is abutted against a rear upper corner portion of the plate 51*c* of the right upper rail 51. Further, the guide portion 64*a*21 of the right front fitting portion 64F is abutted against a right upper corner portion of the front block body 51*b* of the right upper rail 51, or, the guide portion 64*c*21 of the right rear fitting portion 64R is abutted against a left upper corner portion of the rear block body 51*b* and the plate 51*c* of the right upper rail 51. As the automobile seat 1 is lowered in this state, the front block body 51*b* is guided while being in sliding contact with the guide portion 64*b*11 and the guide portion 64*a*21 of the right front fitting portion 64F. In this way, the front block body 51*b* is positioned relative to the right front fitting portion 64F. Further, the rear block body 51*b* and the plate 51*c* are guided while being in contact with the guide portion 64*c*31 and the guide portion 64*c*21 of the right rear fitting portion 64R. In this way, the rear block body 51*b* and the plate 51*c* are positioned relative to the right rear fitting portion 64R. Thereby, it is not necessary to mount the automobile seat 1 on the upper rails 51 while viewing from the lateral lower side of the automobile seat 1, and therefore, it is possible to improve the mounting workability of the automobile seat even when the weight of the automobile seat 1 is great or a shield is mounted to the automobile seat 1.

Further, all of the guide portions 63*b*11, 63*a*21, 63*c*31, 63*c*21, 64*b*11, 64*a*21 64*c*31, 64*c*21 for adjusting the mounting position of the automobile seat 1 relative to the front block body 51*b* and the rear block body 51*b* and the plate 51*c* of the left and right upper rails 51 are formed by bending a lower end portion of a wall portion constituting the fitting portions 63F. 63R. 64F, 64R. In this way, the mounting position of the automobile seat 1 can be adjusted with a simple structure. Furthermore, the fitting portion 63F and the fitting portion 64F can be bolted to the front block body 51*b* from the seat front, and the fitting portion 63R and the fitting portion 64R can be bolted to the rear block body 51*b* from the seat rear. Thereby, it is not necessary to put an operator's hand on the inside of the frame 11 of the seat cushion 10, and hence, it is possible to further improve the mounting workability of the automobile seat. Meanwhile, when a shield is mounted to an outer periphery of the automobile seat 1, an openable door portion may be provided to a bolt fastening portion of the shield.

Hereinabove, specific embodiments have been described. However, the present disclosure is not limited to the appearances and configurations thereof, but various modifications, additions and omissions can be made without departing from the gist of the present disclosure. For example, the present disclosure may include the following examples.

1. In the above embodiment, the front block body 51*b* and the rear block body 51*b* are respectively mounted to the vicinity of the front end portion and the rear end portion of the engaging portion frame 51*a* mounted to the upper surface of the upper rail 51. However, the present disclosure is not limited thereto. For example, the front block body 51*b* and the rear block body 51*b* may be separately formed and may be directly mounted to the upper surface of the upper rail 51, respectively.

2. In the above embodiment, two guide portions are provided for each fitting portion 63F, 63R, 64F, 64R. However, the present disclosure is not limited thereto. For example, three or four guide portions may be provided for each fitting portion. Furthermore, the number of the guide portions may be changed for each fitting portion, as long as two or more fitting portions are provided.

3. In the above embodiment, the fitting portion 63F and the fitting portion 64F are bolted to the front block body 51*b* of the upper rail 51 from the seat front, and the fitting portion 63R and the fitting portion 64R are bolted to the rear block body 51*b* of the upper rail from the seat rear. However, the present disclosure is not limited thereto. For example, the fitting portions may be bolted from the seat side (the outside in the lateral direction).

4. In the above embodiment, each fitting portion 63F, 63R, 64F, 64R is disposed on the frame 11 side of the seat cushion 10, and the front block body 51*b*, and the rear block body 51*b* and the plate 51*c* are disposed on the upper rail 51 side. However, the present disclosure is not limited thereto. For example, on the contrary to this, each fitting portion 63F, 63R, 64F, 64R may be disposed on the upper rail 51 side, and the front block body 51*b*, and the rear block body 51*b* and the plate 51*c* may be disposed on the frame 11 side of the seat cushion 10.

5. In the above embodiment, the present disclosure is applied to an automobile seat. However, the present disclosure may be applied to a seat mounted to a ship or a train, or the like.

What is claimed is:

1. A vehicle seat comprising:
a seat cushion;
a cushion frame integrally including a pair of brackets that extend along a front-rear direction of the vehicle seat and are spaced from each other in a seat width direction; and
a pair of slide rails that extend along the front-rear direction of the vehicle seat and on which the pair of brackets are respectively mounted, the pair of slide rails being configured to support the cushion frame to be slidable relative to a floor, each slide rail including an upper rail, wherein
two engaging portions are respectively provided to each upper rail,
two fitting portions are respectively provided to each bracket and abut against and fit onto the two engaging portions of the corresponding slide rail,
each fitting portion includes at least two wall portions extending in a vertical direction, and
guide portions are provided at lower sides of the at least two wall portions, the guide portions being configured to guide each fitting portion onto each corresponding engaging portion when the pair of brackets is mounted to the pair of slide rails.

2. The vehicle seat according to claim 1, wherein
the at least two wall portions are plate-shaped, and
each guide portion includes an inclined surface defined by a lower end portion of at least one of the two wall portions, the inclined surface extending toward a lower side of the corresponding engaging portion in a direction away from the corresponding engaging portion when the corresponding fitting portion is fitted onto the corresponding engaging portion.

3. The vehicle seat according to claim 1, wherein at least one of the at least two wall portions of each fitting portion is provided with a bolt hole for bolting the at least one wall portion to the corresponding engaging portion.

4. The vehicle seat according to claim 1, wherein the each engaging portion is block-shaped and is provided with a bolt hole.

* * * * *